P. P. WILLIAMS.
TWINE HOLDER.
APPLICATION FILED APR. 1, 1912.
1,054,730.
Patented Mar. 4, 1913.
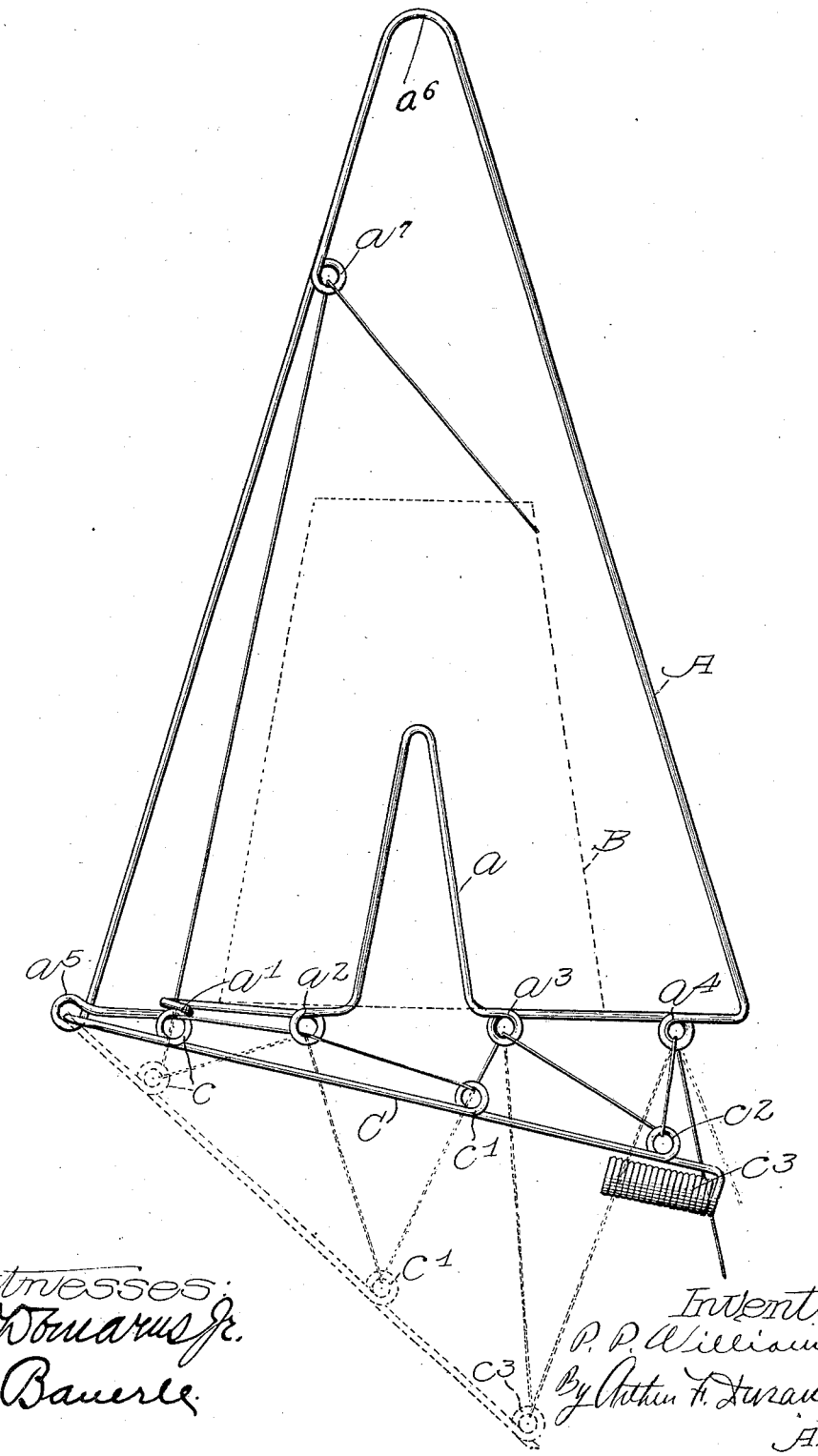

UNITED STATES PATENT OFFICE.

PETER P. WILLIAMS, OF MALVERN, IOWA, ASSIGNOR OF ONE-HALF TO WALTER A. AIRIS, OF CHICAGO, ILLINOIS.

TWINE-HOLDER.

1,054,730.  Specification of Letters Patent.  Patented Mar. 4, 1913.

Application filed April 1, 1912. Serial No. 687,785.

*To all whom it may concern:*

Be it known that I, PETER P. WILLIAMS, a citizen of the United States of America, and resident of Malvern, Mills county, Iowa, have invented a certain new and useful Improvement in Twine-Holders, of which the following is a specification.

My invention relates to twine-holders of that kind in which provision is made for maintaining a tension on the twine, to prevent it from unwinding too fast, and for retracting the remaining end portion when the twine is broken and released.

Generally stated, the object of my invention is to provide a novel, simple and efficient twine-holder of this general character.

A special object is to provide a twine-holder of such character that it can be manufactured cheaply and sold for a comparatively small amount.

To these and other useful ends my invention consists in matters hereinafter set forth and claimed.

In the accompanying drawings the single figure is a side elevation of a twine-holder embodying the principles of my invention.

As thus illustrated, my invention comprises a triangular shaped frame A forming the support for the ball or cone of twine B. This support is made by bending a wire or rod in the shape shown, whereby the base of the triangle has an upright $a$ for the ball or cone of twine. The said wire is so bent that the bottom of the triangle has four lower eyes $a^1$, $a^2$, $a^3$ and $a^4$, the eye $a^1$ being horizontal and the other three being vertical. Also an eye $a^5$ is formed at the lower left hand corner of the triangle, a bent portion $a^6$ at the top of the triangle, and an eye $a^7$ at the sides thereof.

The swinging tension and automatic take-up member C is hinged at one end to the eye $a^5$, and is formed by bending a wire into the desired shape. It has the three eyes $c$, $c^1$, $c^2$ formed along the length thereof, and a tight coil $c^3$ at the outer or distal end, which coil serves as a weight.

In use, the twine is threaded first through the eye $a$, then through the eye $a^1$, next through the eye $c$ and through the eyes $a^2$, $c^1$, $a^3$, $c^2$ and $a^4$ in the order mentioned. When the outer end of the twine is pulled the twine unwinds from the ball or cone and travels through the said eyes, but with sufficient friction and tension to raise the member $c$ in the manner illustrated. After the twine is broken and released, then the member C falls or swings downward to the position shown in dotted lines, and finally hangs vertically, whereby the remaining end portion of the twine is retracted or pulled back. The twine holder hangs above the counter, the upper end $a^6$ being adapted to be suspended in any suitable manner. Thus the action of the member $c$ keeps the twine from running off too fast, and serves also to pull up the end of the twine when it is broken.

Being made entirely of wire, the construction is simple and cheap to manufacture. Also, it is not liable to get broken or out of order.

An important feature of my invention consists, it will be seen, of the provision whereby the swinging member and the support for the twine have a plural connection—that is to say, whereby the twine forms a plurality of connections between these two elements. In this way, and by reason of the zig-zag or back and forth connection which the twine forms between the support and the swinging member, the loose end of the twine is pulled upward to a greater extent than the degree of swing of said member. In other words, the said member may swing downward only a short distance, but at the same time the loose end of the twine will be pulled upward a much greater distance, owing to the plural connection between the two elements, which method of utilizing the twine serves to multiply motion of the swinging member, thus insuring a requisite amount of motion on the part of the twine for a comparatively small amount of motion on the part of the swinging member.

I claim—

1. A twine holder comprising a support having upper and lower edges, a plurality of depending eyes disposed at intervals along said lower edge, a device on the said upper edge for supporting the ball of twine, a member substantially as long as said support, the said support and member being swingingly secured together at one end thereof, eyes disposed at intervals along the upper edge of said member, and means for suspending the support in an elevated position, with the ball of twine thereon, the twine being threaded through said eyes, providing a plurality of connections between the said support and member, and said member being of sufficient weight, and serving by reason of said connection, to draw up the loose end of the twine, to an extent greater than the degree of swing thereof, when said member is allowed to swing downward below the ball of twine.

2. A twine holder comprising a support having upper and lower edges, a plurality of depending eyes disposed at intervals along said lower edge, a device on the said upper edge for supporting the ball of twine, a member substantially as long as said support, the said support and member being swingingly secured together at one end thereof, eyes disposed at intervals along the upper edge of said member, means for suspending the support in an elevated position, with the ball of twine thereon, the twine being threaded through said eyes, providing a plurality of connections between the said support and member, and said member being of sufficient weight, and serving by reason of said connection, to draw up the loose end of the twine, to an extent greater than the degree of swing thereof, when said member is allowed to swing downward below the ball of twine, the said support and means consisting of a single wire bent to form a triangle, and said member consisting of another wire bent into proper shape.

3. A twine holder comprising a support having upper and lower edges, a plurality of depending eyes disposed at intervals along said lower edge, a device on the said upper edge for supporting the ball of twine, a member substantially as long as said support, the said support and member being swingingly secured together at one end thereof, eyes disposed at intervals along the upper edge of said member, and means for suspending the support in an elevated position, with the ball of twine thereon, the twine being threaded through said eyes, providing a plurality of connections between the said support and member, and said member being of sufficient weight, and serving by reason of said connection, to draw up the loose end of the twine, to an extent greater than the degree of swing thereof, when said member is allowed to swing downward below the ball of twine, said eyes being disposed in position to cause the twine to extend in zig-zag fashion across the angle formed between the said support and member, when the said member swings downward.

Signed by me at Malvern, Iowa this 28th day of March 1912.

PETER P. WILLIAMS.

Witnesses:
FLORENCE DURBIN,
A. J. SANNER.

Copies of this patent may be obtained for five cents each, by addressing the "Commissioner of Patents, Washington, D. C."